(12) United States Patent
Green et al.

(10) Patent No.: US 6,197,859 B1
(45) Date of Patent: *Mar. 6, 2001

(54) THERMALLY CONDUCTIVE INTERFACE PADS FOR ELECTRONIC DEVICES

(75) Inventors: Kevin L. Green, Bloomington; Sanjay Misra, Shoreview, both of MN (US)

(73) Assignee: The Bergquist Company, Chanhassen, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,768

(22) Filed: Jan. 30, 1998

Related U.S. Application Data

(63) Continuation-in-part of application No. 08/663,800, filed on Jun. 14, 1993, now Pat. No. 5,950,066.

(51) Int. Cl.$^7$ ............................... C08K 5/10; C08K 3/22
(52) U.S. Cl. ........................ 524/270; 524/430; 524/524
(58) Field of Search ............................. 524/77, 80, 270, 524/271, 272, 404, 424, 430, 524

(56) References Cited

U.S. PATENT DOCUMENTS

| | | | |
|---|---|---|---|
| 4,604,424 | 8/1986 | Cole et al. | 524/862 |
| 4,810,563 | 3/1989 | DeGree et al. | 428/209 |
| 4,842,911 | 6/1989 | Fick | 428/40 |
| 5,116,895 | * 5/1992 | Knutson | 524/252 |
| 5,141,989 | * 8/1992 | Jung | 524/561 |
| 5,306,739 | * 4/1994 | Lucey | 524/413 |

FOREIGN PATENT DOCUMENTS

| | | |
|---|---|---|
| 0258900 | 3/1987 | (EP) . |
| 0382188 | 7/1990 | (EP) . |

* cited by examiner

*Primary Examiner*—Christopher Henderson
(74) *Attorney, Agent, or Firm*—Haugen Law Firm PLLP

(57) ABSTRACT

An interface material for use in forming a coating interposed along a heat dissipating path between a solid state electronic device and a heat sinking surface. The coating consists of a formulation of a thermally stable wax which is formed as an alkyl substituted poly (hydro, methyl-siloxane) wax polymer wherein the alkyl substituted group has a chain length of between 18 and 22 carbon atoms, and being blended with a plasticizer and a solid particulate consisting of alumina, boron nitride, among others. The wax has a melting point of between 30 degrees C. and 90 degrees C., and preferably about 65 degrees C.

4 Claims, 3 Drawing Sheets

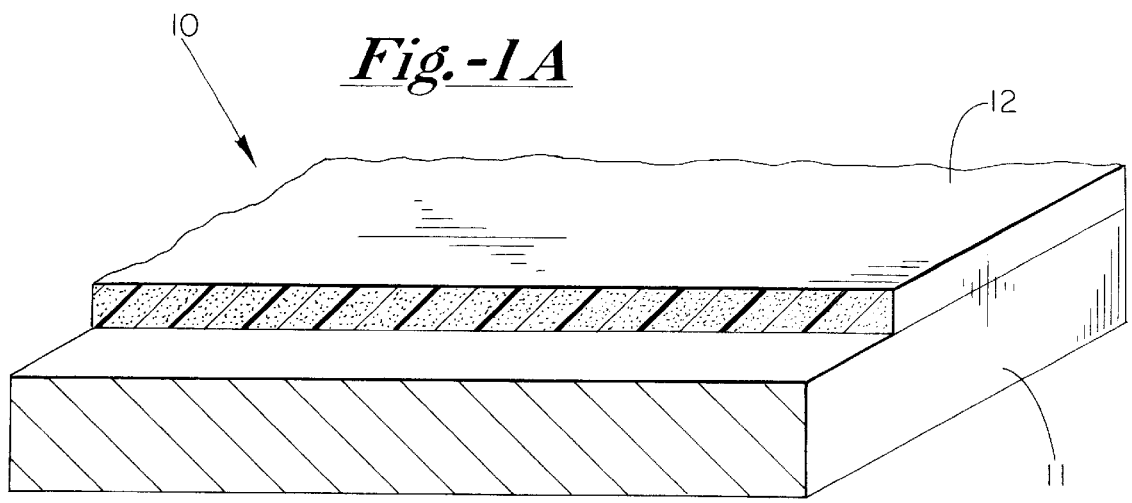
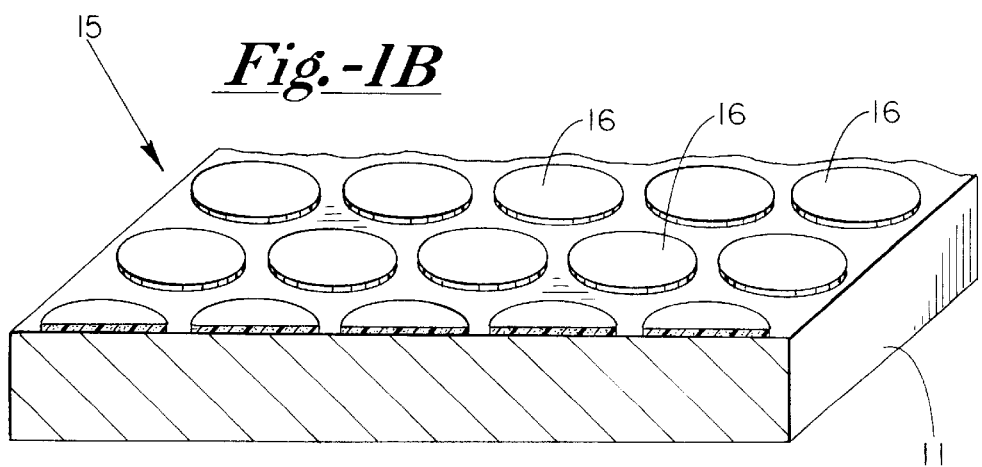

THERMALLY CONDUCTIVE INTERFACE PADS FOR ELECTRONIC DEVICES

CROSS-REFERENCE TO RELATED APPLICATION

The present application is a continuation-in-part of application Ser. No. 08/663,800, filed Jun. 14, 1996, entitled "SEMISOLID THERMAL INTERFACE WITH LOW FLOW RESISTANCE", now U.S. Pat. No. 5,950,066 issued Sep. 17, 1999, assigned to the same assignee as the present application.

BACKGROUND OF THE INVENTION

The present invention relates generally to an interface layer or coating for use in combination with solid state electronic components or other type of heat generating electronic devices, and more particularly to a semisolid interface coating which is adapted to be interposed along a heat dissipating path between a solid state electronic device and a mounting surface. The interface coating of the present invention comprises, in admixture, an alkyl substituted poly (hydro, methyl-siloxane) wax together with a preselected plasticizer and flexibilizer. A particulate solid or filler functions as a thermally conductive component for the blend, and with its small particulate size and high surface area, functions also as a viscosity stabilizer for the blended components. The alkyl substituted poly (hydro, methyl-siloxane) waxes in the formulations of the present invention have a melting point ranging from between about 30 degrees C. and 90 degrees C., and preferably with a melting point ranging above about 45 degrees C. The melting point range of an individual polymer is relatively narrow and sharply defined, thereby contributing to the consistency of performance of these formulations.

The alkyl substituted poly (hydro, methyl-siloxane) waxes present in the interface coating change phase and become at least partially liquid during normal operation of the solid state electronic device with which it is operatively thermally coupled. The interface, when even only partially molten, provides a highly thermally conductive path substantially free of entrapped air so as to facilitate and enhance heat dissipation from the solid state device. The interfaces of the present invention may be applied onto the surfaces upon which the solid state electronic device is either being directly mounted, or alternatively, to which the device is being operatively thermally coupled. The interfaces of the present invention may be applied as required onto surfaces of substrates of either metallic or polymeric materials. These interfaces or coatings may be so applied as continuous layers or may be applied on an intermittent or segmented pattern basis in the form of strips or dots. The coatings may also be die cut and applied to an appropriate surface. In addition to being applied as a single layer on one surface of a suitable substrate, these coatings may be applied two-sided to suitable substrates, in particular thin engineered plastic films. Suitable engineered plastic films include poly-imide, poly-ethylene naphthalate, poly-ethylene-terephthalate, poly-ether imides, poly-sulfone, or poly-phenylene sulfide. Metallic foils such as aluminum foil and woven or non-woven fabrics may also be employed.

Solid state electronic devices or components are in wide use and application, being incorporated in electronic systems generally, including systems used in the fields of data processing, communications, power supply systems, among others. Solid state electronic devices including power transistors, power modules including converters such as AC-to-DC and DC-to-DC and other similar components. The term "solid state electronic devices" is being used herein in a comprehensive sense, and is intended to include solid state circuits wherein a complete circuit is formed from a single block or chip of semiconductor material, solid state circuit elements such as Zener diodes, silicone controlled rectifiers, as well as other solid state components such as transistors and diodes. Other devices falling within the comprehensive meaning of the term includes passive components, thermoelectric devices, as well as lasers, each of which typically require contact with a heat exchanger or a thermally conductive path for heat dissipation. These devices are typically incorporated in packages designed for mounting on a chassis in accordance with the individual requirements of the specific circuit. As power and frequency requirements increase, and as the space available for these devices or components shrink, these packages typically require highly efficient, effective, and reliable means for dissipating heat created by the solid state electronic devices during periods of normal operation, with the heat typically being transferred by thermal conduction from the package to a mounting surface. This thermal conduction may be undertaken either directly, as occurs when the device is mounted upon the heat dissipating surface, or indirectly as occurs when the device is mounted to a surface which is arranged along a thermal path to a heat dissipating member.

In the past, during assembly, it has been common to apply a layer of grease, typically a silicone grease, or a layer of an organic wax to aid in creating a low thermal resistance path between the opposed mating surfaces of the package and the mounting surface. A layer of such grease is typically applied between these mating surfaces in order to displace air and facilitate and enhance thermal conductivity. In certain applications, heat spreaders may be employed along the thermal path to achieve certain heat dissipating objectives, and the interface coatings of the present invention may be employed along the surfaces of heat spreaders as well. In each of these instances, the quantity of entrained air is reduced and thermal conductivity is improved in order to increase thermal energy flow from the electronic device.

In the course of a typical assembly operation prior to the present invention, silicone grease, for example, was applied liberally to the surfaces so as to assure its presence in all of those locations where it is reasonably expected to be needed or required. As a result, the assembly operations utilizing grease typically over-apply the material, and the products become messy, with the grease in certain instances, interfering with subsequent assembly operations and also with subsequent operation of the solid state device. Under application has also presented some problems, particularly regarding performance consistency. The features of the present invention provide a highly thermally conductive coating which may be applied to surfaces along a thermal path, with the coating having a consistent and uniform thickness which contributes to consistency in performance. Given this property in the thermally conductive coating, greater predictability of performance is available from the semiconductor devices utilized in combination with the coating, with these advantages being obtained without experiencing the problems inherent in applications of silicone grease.

SUMMARY OF THE INVENTION

In accordance with the present invention, therefore, an interface for mounting solid state electronic devices is provided in the form of a material in dry film coating form with the coating functioning to enhance thermal transfer from the device or its heat sink to a chassis or the like. The dry film coating form provides advantages over the normally employed grease form. When employed in an actual circuit arrangement, assembly time is shortened, the operation is rendered clean, with ease of application and assembly being provided along with improvements in stability of operation. During normal operation of the solid state electronic devices, the alkyl substituted poly (hydro, methyl-siloxane) wax is blended in with its compatible plasticizers and/or flexibilizers and becomes molten, thereby enhancing the ability of the interface to effectively transfer thermal energy from the device to its mounting chassis. In addition to being highly thermally conductive, the interface coatings of the present invention also provide for high conformability and flow in response to application of exceptionally low forces and resultant low unit forces and pressures. Interfaces of the present invention may be employed wherever typical solid state electronic mounting packages are utilized. Because of their property of low resistance to flow, the interfaces are highly useful and effective when the nature of the package permits only extremely small external forces to be utilized. Some of these products typically tolerate only low or modest forces and/or unit pressures during application of the normally encountered mounting forces, and the coatings of the present invention will flow to conform to the configuration of the surfaces involved. In addition, the alkyl groups present in the alkyl substituted segment of the wax formulation of the present invention are crystalline at room temperature, providing a coating in dry film form at normal room temperatures. Furthermore, this component of the formulation becomes molten or otherwise undergoes a change of phase from solid to liquid at a low temperature such as between about 40 degrees C. and 90 degrees C., and more preferably between about 45 degrees C. and 65 degrees C. In one preferred embodiment, a melting range of about 65 degrees C. is desirably achieved. When undergoing a change of phase, the interface accommodates and conforms to the configurations of the opposed surfaces with which it is in contact, thereby increasing the total area of contact between the interfaces while eliminating or displacing air. This in turn, increases the rate of heat transfer through thermal conduction from the heat generating solid state electronic device to its mounting surface.

Briefly, the interface material of the present invention comprises an alkyl substituted poly (hydro, methyl-siloxane) wax polymer of suitable molecular weight. One such wax polymer is an alkyl substituted poly dimethyl siloxane. The melting point is about 65 degrees C. Suitable flexibilizers are styrenic block copolymers such as styrene-ethylene/ butylene-styrene (SEBS) copolymers with such copolymers being commercially available. Ethylene vinyl acetate (EVA) copolymers and polyvinylbutyral may also be advantageously employed as flexibilizers. Plasticizers such as short chain polystyrene short chain hydrocarbons, penta-erythritol esters of wood rosin may also be used in the blend to enhance flow characteristics. The blend of polymers is in admixture with a thermally conductive viscosity stabilizer in solid particulate form.

Alkyl substituted poly (hydro, methyl-siloxane) waxes useful in accordance with the present invention are semi-solid waxy materials at normal ambient conditions, and remain so when the wax polymer component is blended with particulate solids in the range set forth. The resultant composition or product is conveniently formed as a dry cohesive coating. The coating is highly compliant with a low resistance to flow. Compositions with a melting point ranging from between about 30 degrees C. and 90 degrees C. are useful, and those with a melting point of between about 45 degrees C. and 65 degrees C. are generally preferred, with a melting point of 65 degrees C. being generally preferred for many applications. The siloxane wax polymer is treated to remove impurities or unreacted components so as to yield a substantially purified product with a relatively narrow and sharply defined melting point. The particulate viscosity stabilizer is preferably highly thermally conductive, and is generally selected from the group consisting of alumina, boron nitride, graphite, silicon carbide, diamond, metal powders as well as mixtures thereof.

The interface material of the present invention preferably contains from between about 15% and 35% by weight alkyl substituted poly (hydro, methyl-siloxane) wax polymer, 5% to 15% flexibilizer and up to about 10% plasticizer, with the balance being thermally conductive viscosity stabilizer in particulate form. A preferred formulation range is between 20% and 45% by weight siloxane wax polymer and flexibilizer/plasticizer blend, balance thermally conductive viscosity stabilizing particulate. Preferably, and for most applications, the average particle size of the viscosity stabilizer is less than about 25 microns, it being noted that fillers having smaller particle size below about 5 microns and high surface area are generally preferred. Wax polymers of alkyl substituted poly (hydro, methyl-siloxane) and the ethylene vinyl acetate flexibilizers are both commercially available, as are the various particulate solids including alumina, boron nitride, graphite, diamond, metal powder, and silicon carbide.

As a further feature of the present invention, a thin coating or film typically 0.5 mil or less of a pressure sensitive adhesive may be applied to the outer surfaces of the interface material. Such pressure sensitive adhesive films typically consist of acrylate and/or polyester resins, or blends of such resins, and are widely commercially available. Both have good electrical properties.

Therefore, it is a primary object of the present invention to provide an improved thermally conductive high flow interface coating in dry film form to function as a thermal interfacing material within the heat dissipating path between a solid state electronic device and a mounting surface.

It is a further object of the present invention to provide an improved interface material arranged to be applied to a solid state electronic device or heat sink as a film or coating, and wherein the interface material comprises an alkyl substituted poly (hydro, methyl-siloxane) wax polymer in admixture with a flexibilizer and a thermally conductive viscosity stabilizer.

It is yet a further object of the present invention to provide an improved interface material for interposition within the heat dissipating path between a solid state electronic device and a mounting surface, and wherein the interface material comprises a blend of an alkyl substituted poly (hydro, methyl-siloxane) wax polymer, with the polymer having a melting point of between about 45 degrees C. and 90 degrees C., preferably above about 45 degrees C., and with the siloxane preferably being an alkyl substituted dimethyl siloxane.

Other and further objects of the present invention will become apparent to those skilled in the art upon a study of the following specification, appended claims, and accompanying drawings.

IN THE DRAWINGS

FIG. 1A is a perspective view, partially in section, illustrating one typical interface pad prepared in accordance with the present invention and being in a continuous coating form;

FIG. 1B is a perspective view similar to that of FIG. 1A, and illustrating an interface pad in an alternate configuration or form, specifically a reticulated geometric shape pattern such as a dot pattern;

Figure 3:
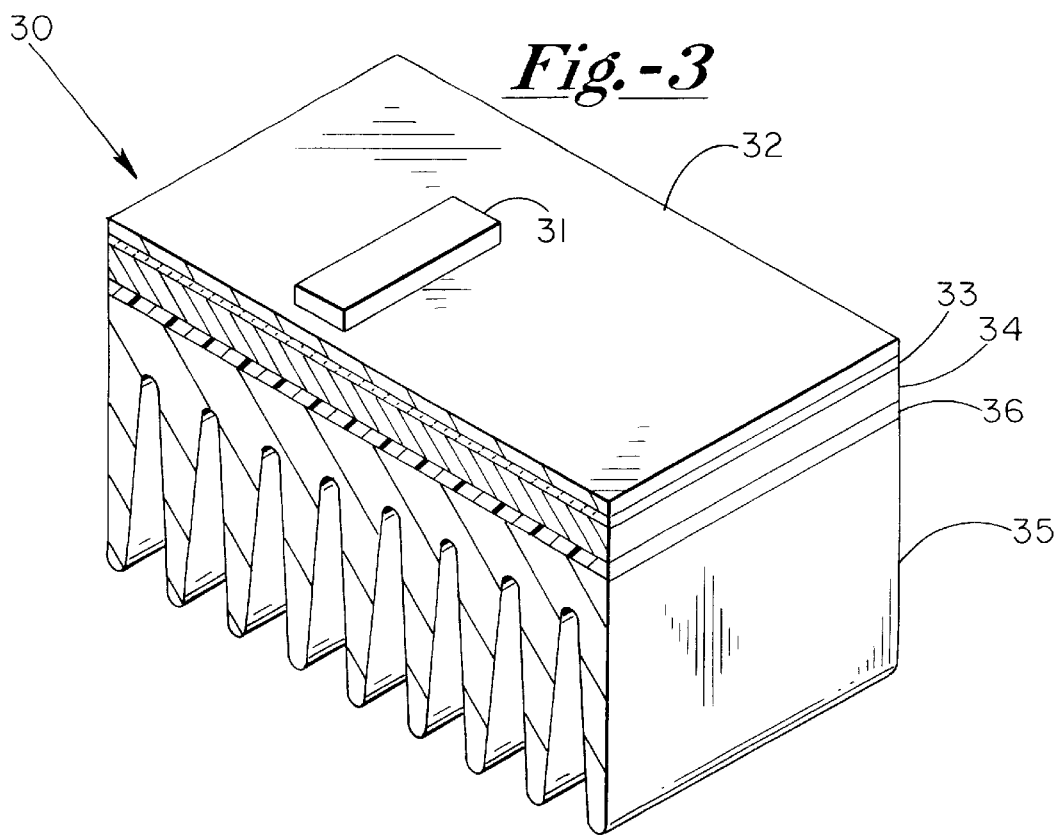
Figure 4:
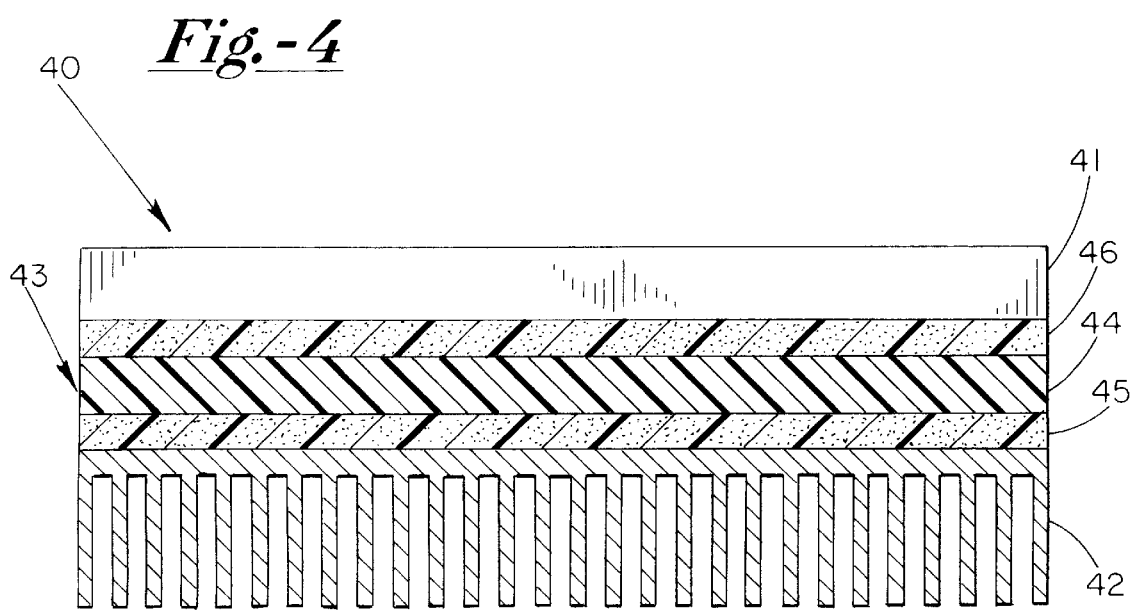

FIG. 3 is a perspective view of a packaged solid state electronic device mounted directly onto a circuit board which comprises one portion of a thermal path leading to a heat sink, wherein a heat spreader is positioned at an intermediate point along the path, wherein the coating of the present invention is interposed between the surfaces of the heat spreader and heat sink; and FIG. 4 is a side elevational view, partly in section, and showing a preferred embodiment of the invention packaged in combination with a solid-state electronic device mounted with a heat dissipating member and with an interface pad prepared in accordance with the present invention being interposed between the electronic device and the heat sink.

DESCRIPTION OF THE PREFERRED EMBODIMENT

In accordance with the present invention, an alkyl substituted poly (hydro, methyl-siloxane) wax polymer was prepared in accordance with the formulation and procedure of Example I below:

Example I

The following formulation was initially prepared:

| Component | Weight | Percent by Weight |
| --- | --- | --- |
| Alkyl substituted poly (hydro, methyl-siloxane) wax | 5.8 grams | 29% |
| Ethylene vinyl acetate | 2.2 grams | 11% |
| Alumina, up to 5 micron particle size | 12 grams | 60%. |

The poly (hydro, methyl-siloxane) wax material has a melting point of 65 degrees C. and is available commercially from Goldschmidt Chemical Co. of Atlanta, Ga. under the trade designation "Tegopren 6846". Other alkyl substituted poly (hydro, methyl-siloxane) wax materials having similar alkyl chain lengths and melting points are available from other commercial sources.

The ethylene vinyl acetate flexibilizer is also available commercially from E. I. DuPont deNemours Corp. of Wilmington, Del.

Alumina particulate is also available commercially with various particle size distributions. Preferably, the present invention employs alumina having particle size below 5 microns and generally free of fines below about 2 microns.

The formulation of this example is blended together in toluene as a solvent, 50% by weight of solids, with toluene having been found to be a useful solvent for most applications. Xylene and straight hydrocarbon solvents may likewise be employed, or alternatively, the blend may be prepared with other admixtures. Once blended, the formulation may be cast in film form, with solvent being permitted to evaporate so as to leave the film cast on a suitable substrate. Substrates such as stress-oriented polyethylene terephthalate (Mylar) may be suitably employed. The solvent is permitted to evaporate sufficiently slowly so as to create the cast film free of cracking.

It will be noted that the formulation of this example employs ethylene vinyl acetate as a flexibilizer. The addition of flexibilizers to formulations of the type of Example I and also similar formulations as set forth in Examples II–V inclusive enhance the ability of the formulation to form flexible and cohesive thin coatings.

Example II

The following formulation was initially prepared:

| Component | Weight | Percent by Weight |
| --- | --- | --- |
| Alkyl substituted poly (hydro, methyl-siloxane) wax | 5.2 grams | 26% |
| Ethylene vinyl acetate | 1 gram | 5% |
| Penta-erythritol ester of wood rosin | 1.3 grams | 6.5% |
| Alumina (48% - 5 micron particle size; 13% less than 5 microns) | 12.5 grams | 62.5% |

The formulation of this example is blended together in xylene as a solvent, 50% by weight of solids, with alkyl having been found to be a useful solvent for certain applications. Straight hydrocarbon solvents may likewise be employed, or alternatively, the blend may be prepared with toluene, xylene and other admixtures. Once blended, the formulation may be cast in film form, with solvent being permitted to evaporate so as to leave the film cast on a suitable substrate. Substrates such as stress-oriented polyethylene terephthalate (Mylar) may be suitably employed. The solvent is permitted to evaporate sufficiently slowly so as to create the cast film free of cracking.

Example III

The following formulation was initially prepared:

| Component | Weight | Percent by Weight |
| --- | --- | --- |
| Alkyl substituted poly (hydro, methyl-siloxane) wax (65 degrees C.) | 29 grams | 18% |
| Ethyl vinyl acetate | 11 grams | 6.8% |
| Alumina nitride (5 micron size) | 120 grams | 74.5% |
| Alkyl substituted silicone | 1.2 grams | 0.7% |

These solids are mixed with 161 grams of toluene as a solvent and treated in accordance with Example I.

Example IV

The following formulation was initially prepared:

| Component | Weight | Percent by Weight |
| --- | --- | --- |
| Alkyl substituted poly (hydro, methyl-siloxane) wax (65 degrees C.) | 6.8 grams | 34% |

-continued

| Component | Weight | Percent by Weight |
| --- | --- | --- |
| Styrene-ethylene-butylene-styrene block copolymer | 2.4 grams | 12% |
| Plasticizer (Piccolastic A-75) | 1.8 grams | 9% |
| Alumina, up to 5 micron particle size | 9 grams | 45% |

The formulation of this example is blended together in toluene, 50% by weight of solids. The styrene-ethylene-butylene-styrene block copolymer is available commercially under the Trade designation Kraton 1652 from Shell Chemical Company of Houston, Tex. Xylene and straight hydrocarbon solvents may likewise be employed, or alternatively, the blend may be prepared with other admixtures. Once blended, the formulation may be cast in film form, with solvent being permitted to evaporate so as to leave the film cast on a suitable substrate. Substrates such as aluminum may be suitably employed having a thickness of 5 mils. The solvent is permitted to evaporate sufficiently slowly so as to create the cast film free of cracking.

The plasticizer is a short chain hydrocarbon resin available from Hercules Chemical of Wilmington, Del. under the trade designation "A-75". This formulation is flexible at room temperature and flows easily above 65 degrees C.

Example V

| Component | Weight | Percent Solid by Weight |
| --- | --- | --- |
| Alkyl substituted poly (hydro, methyl-siloxane) wax (65 degrees C.) | 29 grams | 18% |
| Ethylene vinyl acetate | 11 grams | 6% |
| Alumina, up to 5 micron particle size | 120 grams | 76% |
| Toluene Solvent | 160 grams | |

The formulation of this example is blended together. Once blended, the formulation may be cast in film form, with solvent being permitted to evaporate so as to leave the film cast on a suitable substrate. Substrates such as stress-oriented polyethylene terephthalate (Mylar) may be suitably employed. The solvent is permitted to evaporate sufficiently slowly so as to create the cast film free of cracking.

General Formulation

By way of a general formulation, the following is typical:

| Component | Percent by Weight |
| --- | --- |
| An alkyl substituted poly (hydro, methyl-siloxane) wax, including flexibilizer and plasticizer | 24 to 55% |
| Particulate | balance. |

At low levels or concentrations of particulate, the viscosity of the resultant product falls. When the particulate is incorporated above about 76%, the viscosity becomes excessive and the flow resistance increases, particularly when employed at exceptionally low and/or modest mounting pressures while at the same time it remains necessary to force or exclude entrapped air out of the interface zone. When air becomes entrapped along the thermal path, an increase in thermal resistance and a resultant decrease in performance of the solid state device occurs. In certain instances, reactant products with high viscosity coupled with low shear may be employed. In such instances, because of the small particulate size together with the high surface area it offers, when pressure is applied with a shear force during assembly, thixotropic flow may occur. Such thixotropic behavior renders higher molecular weight wax materials suitable.

The alumina or other suitable particulate content must be present in the ranges specified herein, since when the particulate content is too high, the ability to flow is sacrificed. When too low, flow may become excessive at elevated temperatures.

OPERATION OF THE INVENTION

The present invention in its most useful form will be available as a three layer macro-composite film in which the coating will be applied two sided (1–5 mils) to a thin substrate (0.5–5 mils). The substrate could be a filled or unfilled engineering plastic film (.e.g., polyimide, polyethylene naphthalate, polyethylene terephthalate, polysulfone, polyphenylene sulfide, polyether imide, and the like), aluminum or other metal foils or woven and non-woven substrates (e.g., fiberglass cloth, aramid paper, and the like).

With attention now being directed to FIG. 4 of the drawings, it will be observed that the assembly generally designated 40 comprises an electronic heat generating device 41 arranged at the upper surface of a heat sink or heat spreader 42, and with the coating material of the present invention being provided within thermal conducting interface member 43. Assembly 43 includes a substrate 44 of metal foil, with the interface material of the present invention being interposed on either side thereof as illustrated at 45 and 46. The individual coatings or layers 45 and 46 have a thickness of between 1 and 5 mils, with the substrate member 44 having a thickness ranging from between about 0.5 and 5 mils. Substrates preferably have a thickness of about 1 mil, with the interface layers preferably having a thickness of about 2 mils providing an overall thickness of between about 5 and 6 mils. With respect to the substrate, and in addition to metal foil, filled or unfilled plastic film and/or woven and non-woven fibers may be utilized. With respect to the plastic film, films consisting of polyester such as stress-oriented polyethylene terephthalate, a polyimide such as that certain polyimide/amide sold under the trade designation "Kapton" by E. I. DuPont deNemours Corp. of Wilmington, Del. may be utilized. Other film materials may also be suitably employed. The macro-composite film could be die-cut into an appropriate shape and interposed between a device and the heat sink.

With attention now being directed to FIG. 1A, a mounting surface or chassis generally designated 10 includes a metallic support plate 11 functioning as a heat spreader or heat sink and upon which an interface coating 12 has been applied. As is apparent, the coating is substantially continuous and is arranged and designed for placement of a solid state electronic device upon the upper surface of the coating.

With attention being directed to FIG. 1B, the partial assembly generally designated 15 includes, as was present in FIG. 1A, a metallic support plate 11 upon which is disposed a geometric pattern, including the pattern of dots, such as dots 16—16 in a reticulated coating arrangement.

Specifically, one arrangement of reticulated dots which has been found useful employs dots formed of the composition of the present invention having a diameter of 120 mils, with the dots being arranged on 150-mil centers. The dots may typically have a thickness of between 2 mils and 6 mils, although other thicknesses and physical patterns may be employed as well.

Figure 2:
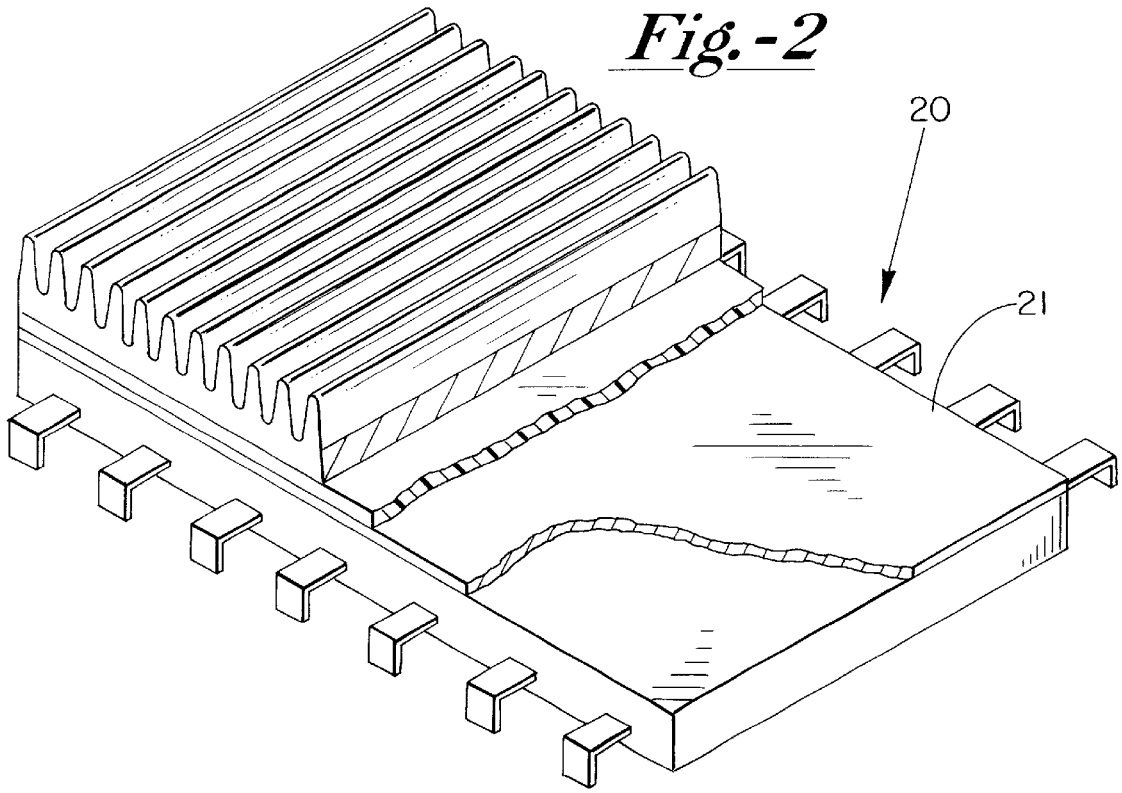
FIG. 2 is a perspective view of a packaged solid state electronic device having a coating applied to a surface thereof to facilitate the formation of a thermally conductive path from the package to a metallic heat dissipating member or heat sink, with a portion of the coating being cut-away and illustrated in section.

With attention now being directed to FIG. 2, a packaged solid state electronic device generally designated 20 is illustrated having an interface coating 21 applied to an outer major surface thereof. The coating 21 is both adherent and coherent, and is formulated in accordance with the present invention. Depending upon the configuration and/or geometry of the circuit in which the packaged solid state electronic device is inserted, the coating 21 may provide an interface directly between the device and a heat sink, or alternatively between the device and a heat spreader. See, for example, the arrangement in the configuration set forth in FIG. 3.

With attention being directed to the alternate arrangement of FIG. 3, it will observed at the assembly generally designated 30 comprises a power device 31 arranged at the upper surface of conductive circuit layer 32, with dielectic layer 33 supporting conductive layer 32. A metal heat spreader is interposed along the thermal path as at 34, with the thermal path ultimately leading to heat sink 35. The coating material of the present invention is shown at 36, interposed between the surfaces of heat spreader 34 and heat sink 35. In this arrangement, the thermal energy from power device 31, along with any other power devices positioned along the surface of conductive layer 32, will dissipate heat along the thermal path leading to and terminating with heat sink 35. For most purposes, dielectric layer 33 is fabricated from a suitable thermally conducting dielectric, such as, for example, any of the well-known thermally conductive ceramic dielectrics.

The formulations of the present invention have long lifetimes with suitable and consistent performance. The lifetimes are considered to be significantly longer than those for components and formulations presently in use, such as silicone greases, and the like.

By way of further example, thermal weight loss data suggests that the material will demonstrate a slow rate of decomposition, thereby contributing to long life.

It will be appreciated that the examples provided hereinabove are illustrative only and are not to be regarded as a limitation upon the scope of the following appended claims.

What is claimed is:

1. A thermally conductive interface pad for interposition along a heat dissipating path between a solid state electronic device and a heat sinking surface and comprising a blend of:

(a) a thermally stable wax component comprising an alkyl substituted poly (hydro, methyl-siloxane) wax present in the range of from 15% to 35% and with the wax having a melting point between 30 degrees C. and 90 degrees C.;

(b) a flexibilizer component selected from the group consisting of ethylene vinyl acetate, styrenic thermoplastic elastomers consisting of block copolymers of styrene-ethylene-butylene-styrene and polyvinylbutyral present from 5% to 15%;

(c) a plasticizer component selected from the group consisting of short chain polystyrene; short chain hydrocarbons which are flexible at room temperature and which flow above 65° C. and penta-erythritol esters of wood rosin present in an amount ranging up to 10%; and (d) a thermally conductive particulate component selected from the group consisting of alumina, boron nitride, graphite, silicon carbide, diamond, metallic powders, and mixtures thereof, with the particulate having an average particle size of up to about 5 microns and present in an amount of from 45% to 76%.

2. The interface pad of claim 1 being particularly characterized in that the substituted alkyl group for the poly (hydro, methyl-siloxane) wax component has a chain length of from 18 to 22 carbon atoms.

3. The interface pad of claim 1 being particularly characterized in that the flexibilizer component is ethylene vinyl acetate.

4. The interface pad of claim 1 being particularly characterized in that the particulate component is alumina having an average particle size of about 5 microns.

* * * * *

UNITED STATES PATENT AND TRADEMARK OFFICE
CERTIFICATE OF CORRECTION

| | |
|---|---|
| PATENT NO. | : 6,197,859 B1 |
| APPLICATION NO. | : 09/016768 |
| DATED | : March 6, 2001 |
| INVENTOR(S) | : Kevin L. Hanson and Sanjay Misra |

Page 1 of 1

It is certified that error appears in the above-identified patent and that said Letters Patent is hereby corrected as shown below:

On the title page

Item (12) should read --Hanson et al. --.

Item (75) Inventors should read: --Kevin L. Hanson and Sanjay Misra--.

Signed and Sealed this

Twenty-first Day of August, 2007

JON W. DUDAS
*Director of the United States Patent and Trademark Office*